United States Patent [19]

Walters et al.

[11] Patent Number: 5,186,549

[45] Date of Patent: Feb. 16, 1993

[54] FLEXIBLE MOUNTING DEVICE FOR FURNITURE PRODUCTS AND THE LIKE

[76] Inventors: R. Jeffrey Walters, 28536 Knickerbocker Rd., Bay Village, Ohio 44140; Paul Dennstedt, 26090 Byron Dr., North Olmsted, Ohio 44070

[21] Appl. No.: 895,200

[22] Filed: Jun. 5, 1992

Related U.S. Application Data

[63] Continuation of Ser. No. 607,238, Oct. 31, 1990, abandoned.

[51] Int. Cl.⁵ .................. F16C 33/60; F16C 35/04; F16C 23/06; A47C 3/02
[52] U.S. Cl. ............................ 384/505; 297/281; 384/428; 384/519; 384/585
[58] Field of Search ................ 384/428, 442–444, 384/456, 499, 502, 505, 515, 519, 585, 584, 583; 297/276–282; 74/502.6

[56] References Cited

U.S. PATENT DOCUMENTS

| 1,909,747 | 5/1933 | Bohn | 384/505 |
| 1,909,748 | 5/1933 | Bohn | 384/515 |
| 1,965,785 | 7/1934 | Vallone | 297/281 |

FOREIGN PATENT DOCUMENTS 2195880  4/1988  United Kingdom ............... 384/428

Primary Examiner—Thomas R. Hannon
Attorney, Agent, or Firm—Watts, Hoffmann, Fisher & Heinke

[57] ABSTRACT

A bearing assembly for use with a glider-type furniture piece or the like having a support frame and a carriage member adapted for movement relative to the support frame, the bearing assembly including an inner race member having a recess groove therein and an outer race member having a recess formed therein, roller bearings disposed in an annular raceway defined by the recesses, the inner race member having an upwardly and inwardly bent flange-like edge extending around a major peripheral portion thereof, the outer race member adapted to be frictionally secured beneath the bent edge, and the inner race member having an integral flange like portion adapted to mount a strap-like member for interconnection between the support frame and the carriage member.

5 Claims, 5 Drawing Sheets

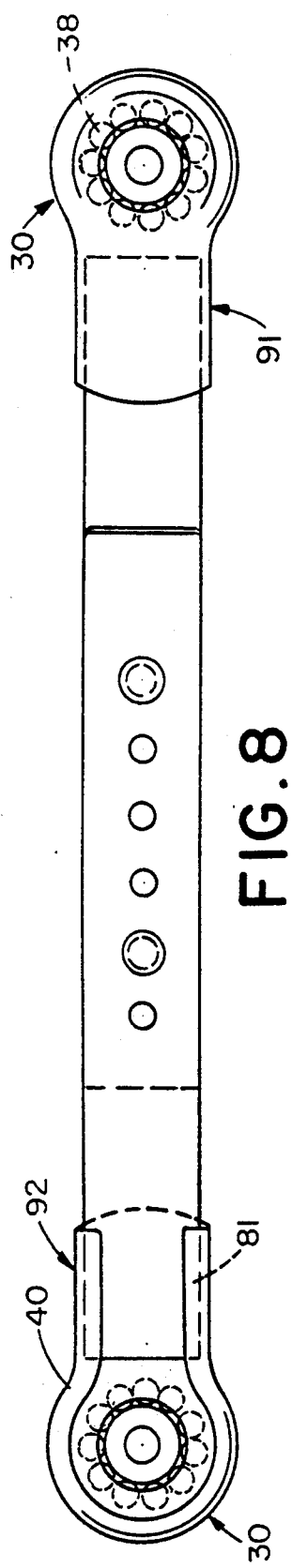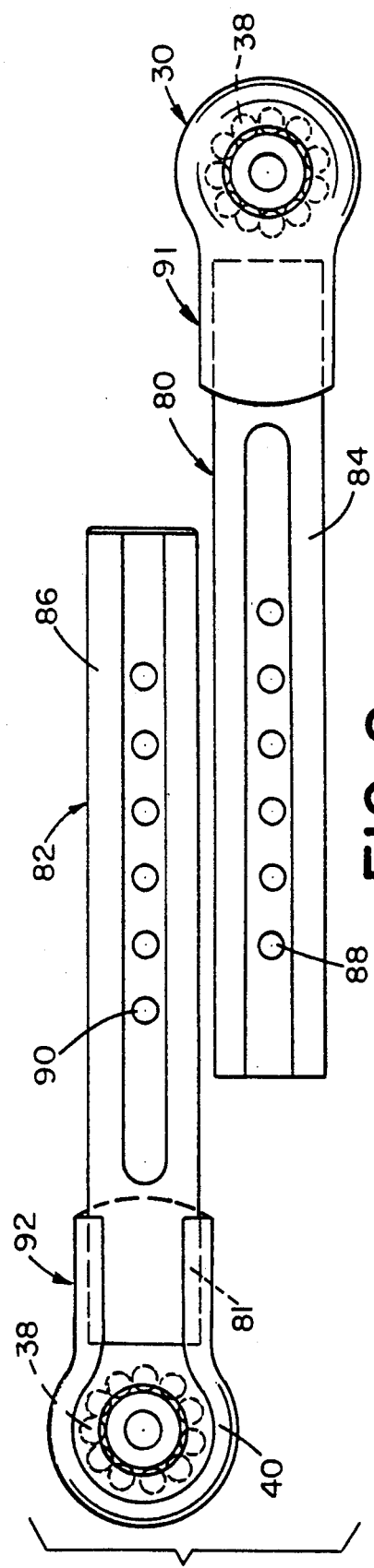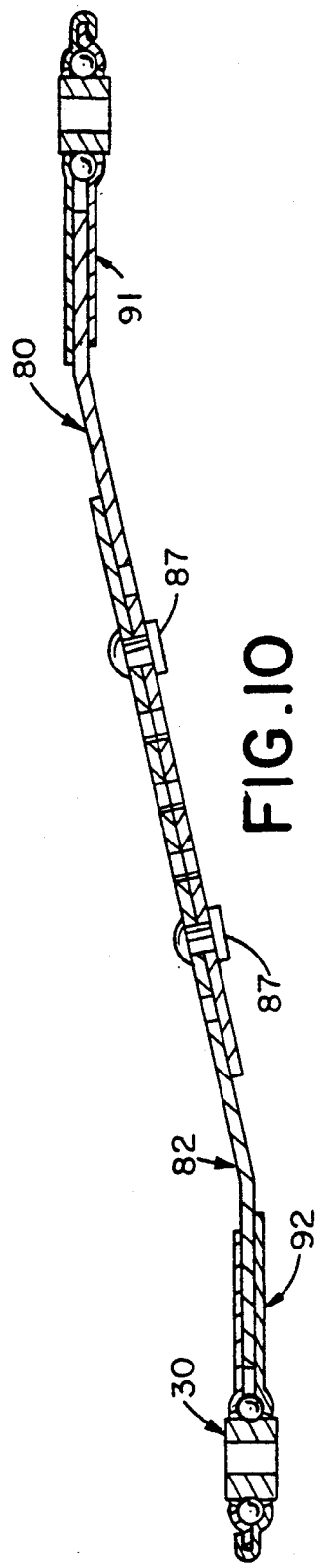

5,186,549

FLEXIBLE MOUNTING DEVICE FOR FURNITURE PRODUCTS AND THE LIKE

This application is a continuation of application Ser. No. 07/607,238, filed Oct. 31, 1990, now abandoned.

TECHNICAL FIELD

The present invention relates to an improved bearing assembly flexible support device which may be used in connection with the operation of furniture, such as glider-type chairs, couches, patio swings and the like.

BACKGROUND OF THE INVENTION

The present invention relates to support devices and more particularly to an improved construction for a bearing assembly and a flexible support arrangement or for mounting glider-type furniture items such as chairs, couches, swings and the like. This invention is generally related to applicant's prior U.S. Pat. No. 1,909,747 which patent is now expired. This patent discloses a bearing unit comprising, in combination, inner and outer race member in conjunction with a ball bearing arrangement located therebetween and in association with first and second plates for attachment to a rigid cross-bar. This cross-bar is illustrated in FIG. 1 of U.S. Pat. No. 1,909,747 the disclosure of which is fully incorporated by reference herein.

In accordance with the present invention, there is provided an improved bearing in association with a selectively adjustable rigid strap and in another embodiment, a flexible strap in the form of flexible reinforced straps. In either embodiment, the construction provides a flexible support between the fixed mounting member of the furniture piece and the movable component which may include, for example, the seat portion, as in the case of a glider-type chair.

SUMMARY OF THE INVENTION

In a furniture piece of the glider-type such as a porch chair, couch, swing and the like comprising a relatively stationery frame member providing a support for a relatively movable carriage member of the type for mounting a seat or the like, said frame member having two generally horizontally extending support members and said carriage member having at least two horizontally extending carrier members extending generally parallel to said support members, at least two pairs of selectively adjustable strap-like members connecting said support members in a hanger-like relationship from said support members via bearing assemblies, and deposed ends of each of said strap-like members being mounted by a roller bearing means to said carrier and support members.

BRIEF DESCRIPTION OF THE DRAWINGS

FIG. 8 is a top plan view of another embodiment of a adjustable strap member in accordance with the present invention;

FIG. 9 is a top plan view of the strap member of FIG. 8 and illustrated in a disassembled condition; and, FIG. 10 is a side elevational view of the strap member illustrated in FIG. 8.

DESCRIPTION OF THE PREFERRED EMBODIMENT

Figure 1:
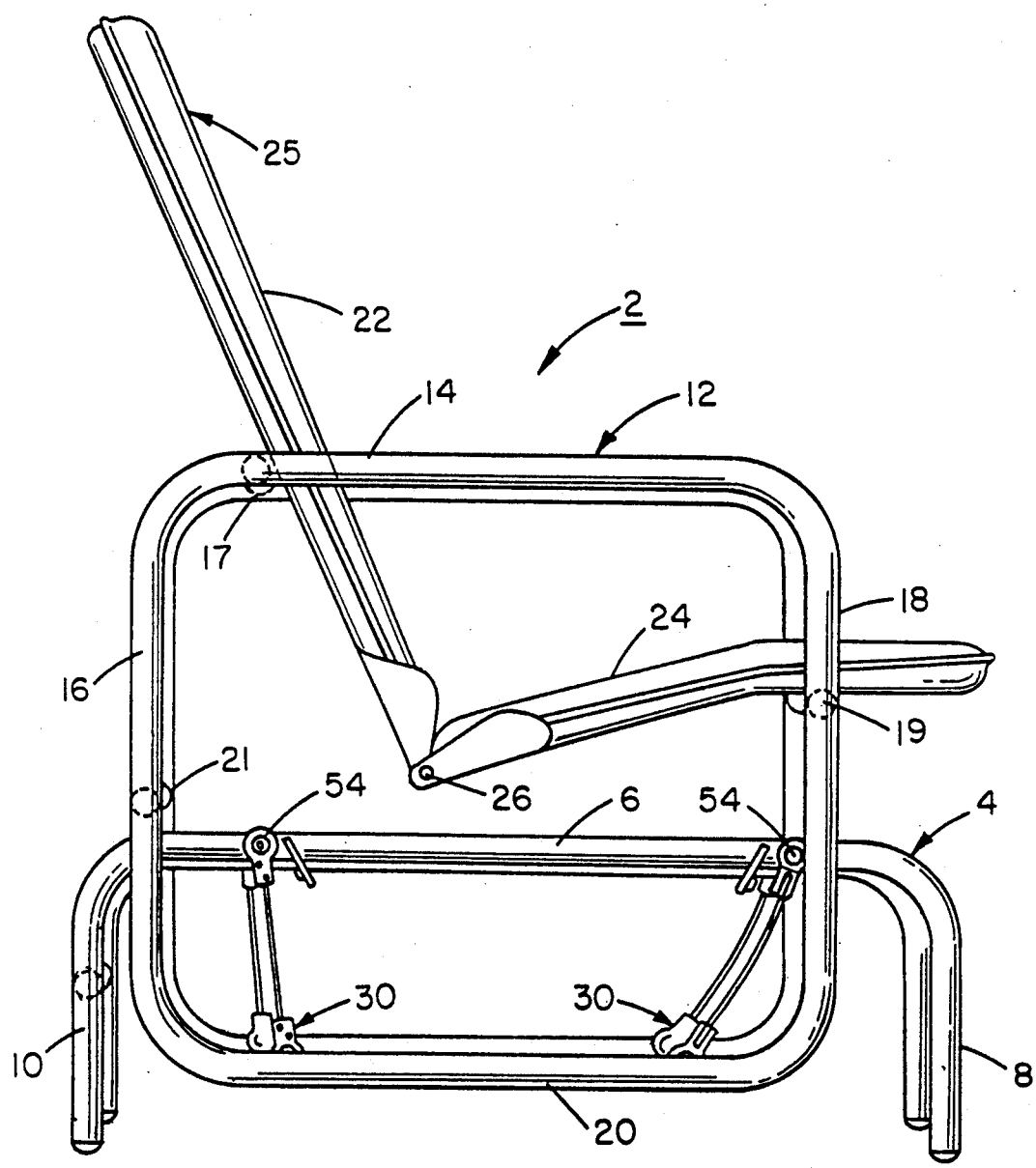
FIG. 1 is a side elevation view illustrating a furniture piece in the form of a chair glider in accordance with the present invention.
Figure 2:
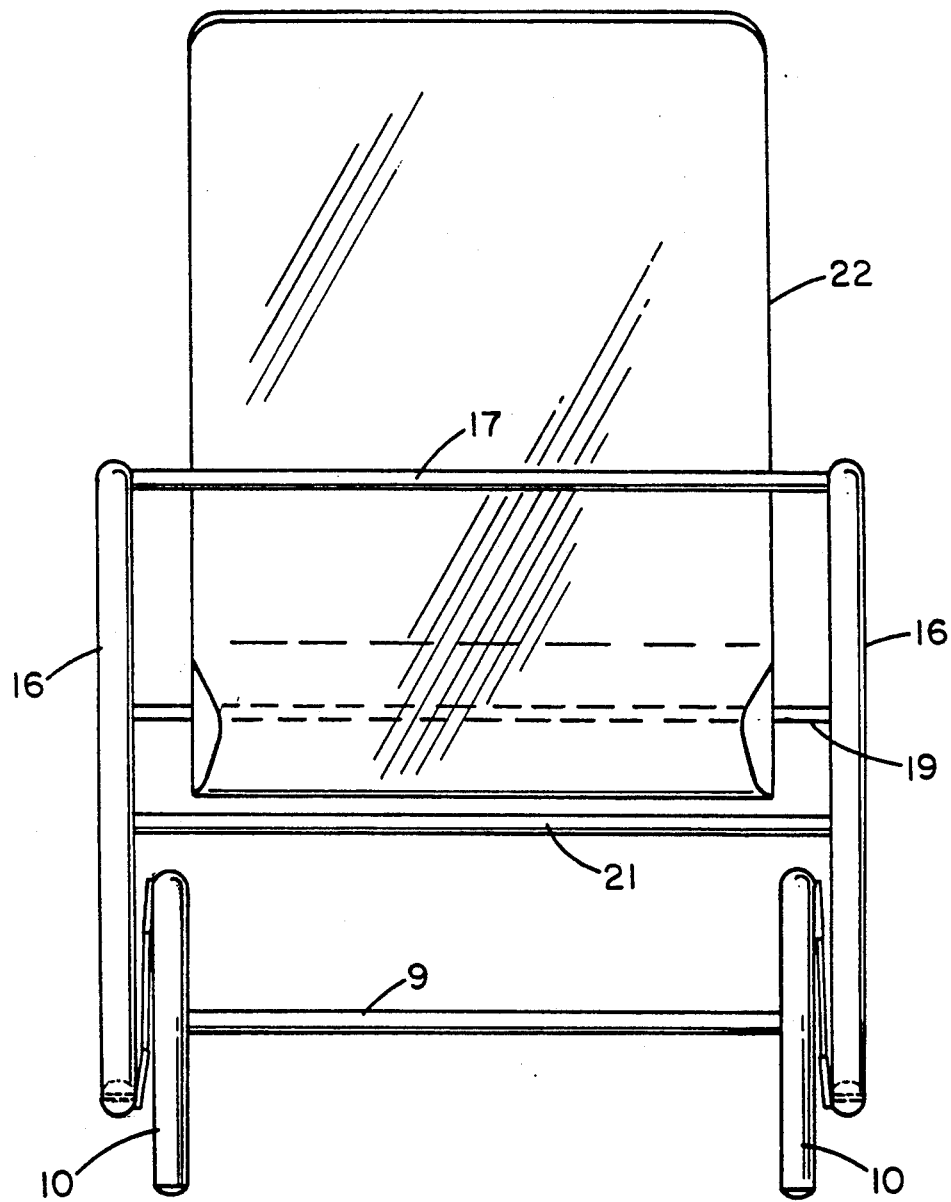
FIG. 2 is a rear view of the chair glider illustrated in FIG. 1.

Referring again to the drawings and particularly to FIGS. 1 and 2 thereof, there is illustrated a glider-type chair, designated generally at 2, which includes a support brace 4 having two pair of support members each being of an identical construction. Each member includes a horizontal support member 6 with an integral downwardly extending legs 8 and 10. These constitute support frames which are interconnected by cross-members 9, as illustrated in FIG. 2. On the support frame 4, is mounted a carriage member, as at 12, having a pair of identical frames, (i.e., square) defined by upper and lower 14 and 20 carrier members and interconnecting end members 16 and 18. The frames are connected by cross-members 17, 19 and 21. As illustrated in FIG. 2, the carriage member 12, in effect, is disposed over and around the support frame 4 and is relatively movable with respect thereto.

The carriage member 12 supports a chair, designated at 25, having a seat portion 24 and a back portion 22 hinged together as at 26.

Now in the invention, there is an interconnection between the support frame 4 and the carriage member 12 which enables gliding movement therebetween. In the invention, this interconnection is accomplished via several embodiments all of which incorporate a novel bearing assembly, designated generally at 30, each of which is of an identical construction for fixedly attaching a flexible and/or selectively adjustable interconnection strap therebetween.

Figure 3:
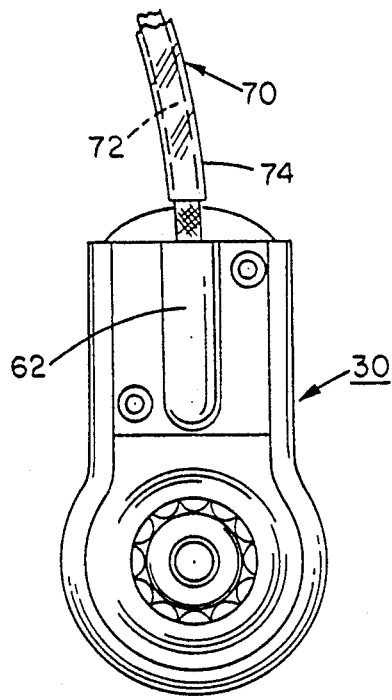
FIG. 3 is a fragmentary, large view of the bearing members made in accordance whit the present invention.
Figure 4:
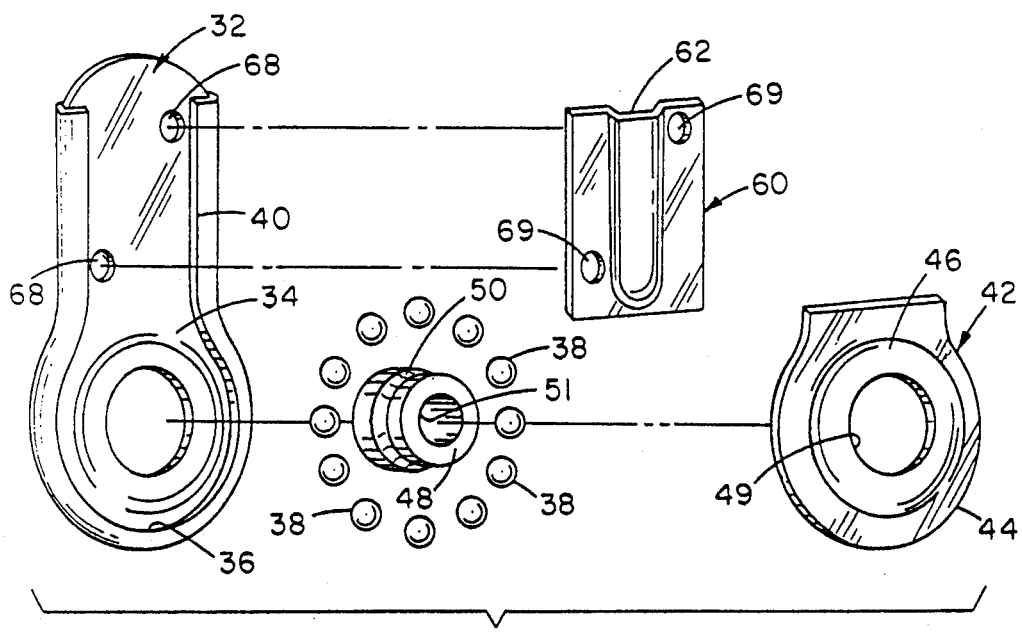
FIG. 4 is a general assembly view illustrating component parts of the bearing assembly as made in accordance with the present invention.

As best illustrated in FIGS. 3 and 4, the bearing assembly 30 includes an inner race member 32 which is made from a flat metal stamping which has a generally circular end portion with a recessed annular track 36 adapted to receive a series of ball bearings 38 therein. The inner race member 32 is provided with an integral, inwardly bent edge 40 which engagably receives therein an outer race member 42 which has a generally circular flat base 44 also made from a metal stamping and has an integral recessed annular track 46 which fits over and is complementary shaped to the annular recess track 36 in the inner race member 32 to provide an annular trackway for the ball bearings 38. A hub member 48 of hollow construction is disposed intermediate the roller bearings 38 and has a radial groove 50 to receive the bearings in rolling relation relative to the track defined by the inner and outer race members. The hub 48 fits within the annular opening, as 49, defined between the inner and outer race members with the hub having a central bore 51 for securement, such as by bolts or the like, to the carriage 12 and support member 4 with the bolts being identified generally at 54 in FIG. 1.

The bearing 30 may further include a securement plate member, as at 60, which is received under the bent edges 40 of the inner race member 32 and may be provided with an axial channel, as at 62, for receiving the terminal end of a strap member, as at 70, therein. Suitable holes, as at 68 and 69, may be provided in the outer race and securement members to facilitate attachment of the pieces together such as by rivets or other suitable fastening means, as desired.

As best seen in FIG. 3, the strap member 70 is provided in the form of a metallic wire of cable 72 which may be encapsulated within an outer polymeric recover 74. By this arrangement there is provided a flexible, high strength, interconnection between the support frame and the carriage, such arrangement being durable and wear-resistant. As shown, the channel acts to crimp the terminal end of the cable-like strap 70 against the confronting upper surface of the inner race member 32. This holds the cable-like strap in a firm and secured position relative to the bearing 30.

By this construction and arrangement, it will be seen that the bent edge provides a substantially re-enforced structure which tends to distribute the load forces around the periphery of the bearing. This acts to minimize stress forces on the periphery of the bearing for optimum durability and hence, reliability.

Figure 5:
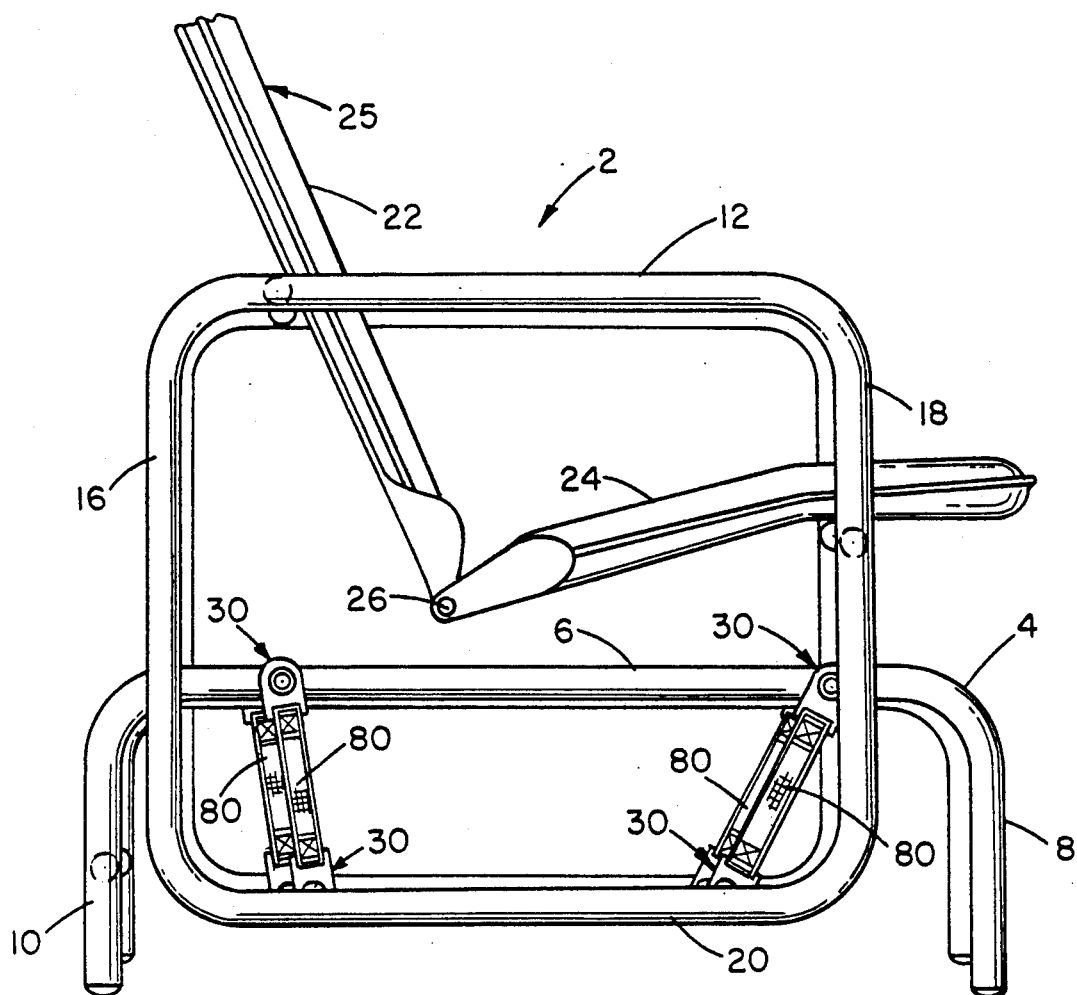
FIG. 5 is a side elevation view illustrating a modified form and a flexible strap arrangement of the present invention.
Figure 6:
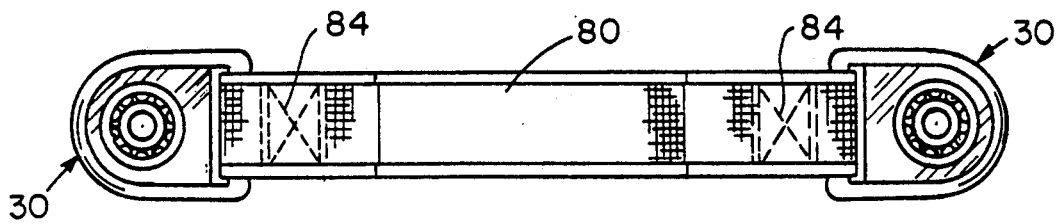
FIG. 6 is a top plan view of one embodiment of the flexible strap the present invention.
Figure 7:
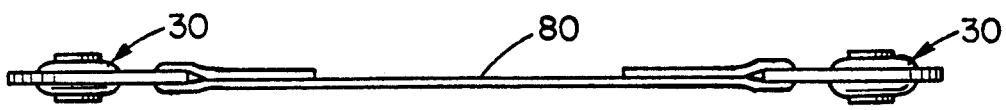
FIG. 7 is a side elevational view of the strap member illustrated in FIG. 6.

In FIGS. 5, 6 and 7, there is illustrated a modification of the invention and wherein like parts are identified by like reference numerals throughout. In this embodiment, the bearings, as at 30, are of similar construction but in this form the flexible element is in the form of a flat strap 80 which may be from a high strength fabric and/or polymeric material. As shown in FIGS. 6 and 7, the bearing may be provided at one end with a buckle-like construction, as at 82, and with the free ends of the strap 80 being looped through the buckle and then stitched, as at 84, to secure the free ends in a manner as no one in the art.

In FIGS. 8, 9 and 10, there is illustrated a preferred embodiment of the invention. In this embodiment, the bearings 30 are interconnected by an adjustable strap arrangement wherein its axial length can be pre-determined, as desired. As shown, this strap assembly includes a pair of strap members 80 and 82 which are of identical construction and attached by crimping, as at 81, to the respective bearings 30. Each strap member 80, 82 includes an elongated metallic strap element 84 and 86 which may be of a polygonal (i.e., rectangular) configuration and each having a series of axially spaced holes, as at 88 and 90, to provide selective adjustment of the length of the strap member via suitable fasteners, as at 87, such as rivets or the like. The bearings have bent flanges 40 and having parallel axially extending portions 81. These portions are crimped over the material of the strap elements 84 and 86 to provide the securement with the respective bearing.

The holes 88 and 90 may be axially spaced in predetermined relation to provide the desired length-wise adjustment of the strap in predetermined increments, such as one half inch or the like, as shown. As best illustrated in FIG. 10, the bearings each have integral, flat flange portions 90 and 92 which secure the respective strap elements 84 and 86 in an off-set relation so as to provide a direct or right angle connection to the bearing. This facilitates a more uniform distribution of load forces on the bearing elements to reduce wedging of the ball bearings between the inner and outer race members. That is, the flanges 90 and 92 extend in parallel planes but the strap elements 84 and 86 extends at an oblique angle therebetween so as to be disposed in the off-set relationship illustrated in gear 10.

Other advantages and objects of the present invention will become apparent when taken in conjunction with the appended claims.

We claim:

1. A bearing assembly for use with a glider-type furniture piece having a support frame and a carriage member adapted for movement relative to the support frame, the bearing assembly including an inner race member having a recess groove therein and an outer race member having a recess formed therein, roller bearing means disposed in an annular raceway defined by said recesses, said inner race member having an upwardly and inwardly bent flange-like edge extending around a major peripheral portion thereof, said outer race member adapted to be frictionally secured beneath said bent edge, and said inner race member having an integral flange like portion adapted to mount a strap-like member, and a strap-like member selected from a generally rigid selectively adjustable strap-like member and a flexible strap-like member for interconnection between said support frame and said carriage member.

2. A bearing assembly in accordance with claim 1, wherein said strap-like member includes an elongated strap member of a generally rigid construction fixedly secured at one end to said bearing assembly, the strap member including a strap element having a plurality of axially spaced holes disposed such that said holes in a second respective strap element can be disposed in overlying relationship therewith, and a fastener means adapted to be received through aligned of said holes for securing said strap elements in a predetermined and lengthwise adjustment.

3. A bearing assembly in accordance with claim 2, wherein the strap elements are disposed in overlapping condition in the installed position and said strap elements being disposed at an oblique angle with respect to the outwardly extending flange portions of the respective bearing assemblies.

4. A bearing assembly in accordance with claim 1, wherein said strap-like member includes a flexible cable member having attached at an opposite end a second bearing assembly, said cable being encapsulated with a cover made from a polymeric material.

5. A bearing assembly in accordance with claim 1, including a buckle-like flange portion and wherein said strap-like member includes an elongated flexible strap element made from a fabric and/or polymeric material, said strap element being looped around said buckle-like flange portion and an opposite end of said strap member being looped around the buckle-like flange portion of a second bearing assembly.

* * * * *